US010334496B2

United States Patent
Teyeb et al.

(10) Patent No.: US 10,334,496 B2
(45) Date of Patent: Jun. 25, 2019

(54) TRAFFIC STEERING BETWEEN WIRELESS ACCESS NETWORKS

(71) Applicant: Telefonaktiebolaget LM Ericsson (publ), Stockholm (SE)

(72) Inventors: Oumer Teyeb, Solna (SE); Mattias Bergström, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 34 days.

(21) Appl. No.: 15/553,775

(22) PCT Filed: Mar. 3, 2015

(86) PCT No.: PCT/EP2015/054447
§ 371 (c)(1),
(2) Date: Aug. 25, 2017

(87) PCT Pub. No.: WO2016/138948
PCT Pub. Date: Sep. 9, 2016

(65) Prior Publication Data
US 2018/0242193 A1    Aug. 23, 2018

(51) Int. Cl.
*H04W 36/22*    (2009.01)
*H04W 76/20*    (2018.01)
(Continued)

(52) U.S. Cl.
CPC ........... *H04W 36/22* (2013.01); *H04W 76/20* (2018.02); *H04W 28/08* (2013.01); *H04W 76/38* (2018.02); *H04W 88/06* (2013.01)

(58) Field of Classification Search
CPC .............................. H04W 36/22; H04W 76/20
See application file for complete search history.

(56) References Cited

U.S. PATENT DOCUMENTS

2014/0328193 A1* 11/2014 Horn ............... H04W 24/00
370/252
2015/0031367 A1* 1/2015 Singh ............... H04W 36/08
455/437
(Continued)

FOREIGN PATENT DOCUMENTS

WO    2014163566 A2    10/2014
WO    2014182211 A1    11/2014

OTHER PUBLICATIONS

International Search Report and Written Opinion dated Nov. 23, 2015 for International Application Serial No. PCT/EP2015/054,147, International Filing Date: Mar. 3, 2015 consisting of 12-pages.
(Continued)

*Primary Examiner* — Gary Mui
(74) *Attorney, Agent, or Firm* — Sage Patent Group

(57) ABSTRACT

A terminal receives criteria from a first wireless access network. The criteria comprise reporting criteria and steering criteria. The terminal operates in a first mode for a first time period until expiry of a timer and operates in a second mode after expiry of the timer. Operation in the second mode is different from operation in the first mode. One of the first mode and the second mode comprises a traffic steering mode in which the terminal directly steers at least some traffic when the steering criteria are met and the other one of the first mode and the second mode comprises a measurement reporting mode in which the terminal sends a measurement report when the reporting criteria are met and waits for a traffic steering instruction to steer at least some traffic the first wireless access network or to a second wireless access network.

22 Claims, 14 Drawing Sheets

(51) Int. Cl.
*H04W 76/38* (2018.01)
*H04W 28/08* (2009.01)
*H04W 88/06* (2009.01)

(56) References Cited

U.S. PATENT DOCUMENTS

| | | | | |
|---|---|---|---|---|
| 2015/0043373 A1* | 2/2015 | Wu | H04W 48/16 | 370/252 |
| 2015/0078153 A1* | 3/2015 | Kuo | H04W 76/27 | 370/230 |
| 2015/0271729 A1* | 9/2015 | Sirotkin | H04W 48/00 | 370/332 |
| 2015/0351024 A1* | 12/2015 | Jang | H04W 48/18 | 370/329 |
| 2016/0029295 A1* | 1/2016 | Nagasaka | H04W 48/18 | 370/237 |
| 2016/0044550 A1* | 2/2016 | Lee | H04W 36/0066 | 370/331 |
| 2017/0367010 A1* | 12/2017 | Jia | H04W 28/08 | |
| 2018/0167839 A1* | 6/2018 | Jung | H04W 28/08 | |

OTHER PUBLICATIONS

3GPP TSG-RAN WG2 #82, Tdoc R2-131886, Title: "WLAN/3GPP Radio Interworking—More on IDLE and CONNECTED mode solution," Source: Ericsson, ST-Ericsson, Orange, Conference Location and Date: Fukuoka, Japan May 20-24, 2013 consisting of 10-pages.

3GPP TR 37.834, V12.0.0, Title: "3rd Generation Partnership Project; Technical Specification Group Radio Access Network; Study on Wireless Local Area Network (WLAN)-3GPP radio interworking," Jan. 7, 2014, consisting of 17-pages.

3GPP TSG-RAN WG2 #87, R2-143181, Title: "Procedures of WLAN/3GPP Radio Interworking for UMTS," Source: Intel Corporation, Conference Location and Date: Dresden, Germany, Aug. 18-22, 2014 consisting of 5-pages.

* cited by examiner

TRAFFIC STEERING BETWEEN WIRELESS ACCESS NETWORKS

CROSS-REFERENCE TO RELATED APPLICATIONS

This application is a Submission Under 35 U.S.C. § 371 for U.S. National Stage Patent Application of International Application Number: PCT/EP2015/054447, filed Mar. 3, 2015 entitled " TRAFFIC STEERING BETWEEN WIRELESS ACCESS NETWORKS," the entirety of which is incorporated herein by reference.

TECHNICAL FIELD

The present disclosure is generally related to wireless communications systems, and is more particularly related to techniques for controlling the operation of terminals with respect to wireless access networks.

BACKGROUND

There is increasing interest in allowing a wireless terminal to use different radio access technologies (RATs). There is a range of radio access technologies standardised by the 3rd-Generation Partnership Project (3GPP), including: Long-Term Evolution (LTE), Universal Mobile Telecommunications System (UMTS)/Wideband Code-Division Multiple Access (WCDMA), High Speed Packet Access (HSPA) and Global System for Mobile Communications (GSM). There is also a range of non-3GPP radio access technologies, such as wireless local-area network (WLAN) technology and Worldwide Interoperability for Microwave Access (WiMAX).

3GPP cellular networks offer coverage across a wide geographic area. The coverage area of 3GPP networks and non-3GPP networks may overlap. For example, Wi-Fi access points may be located within the coverage area of a 3GPP network. A non-3GPP technology may be integrated to some extent with a 3GPP network.

For a wireless operator, there is a challenge of providing intelligent mechanisms for interworking between different radio access technologies that have been standardised in isolation from each other.

A network-assisted interworking mechanism is described in 3GPP release 12. The 3GPP Radio Access Network (RAN) provides assistance parameters that help a terminal in performing access selection and traffic steering. The terminal is also provided with RAN rules/policies that make use of these assistance parameters. The assistance parameters may include threshold values for 3GPP signal related metrics, WLAN signal related metrics. One example of a RAN rule that uses the threshold value could be that the terminal should connect to a WLAN if the 3GPP signal level is below the signalled 3GPP signal level threshold at the same time as the WLAN signal level is above the signaled WLAN signal level threshold. The RAN may also indicate to the terminal which WLANs the mechanism should be applied to by sending WLAN identifiers.

The RAN assistance parameters (thresholds, WLAN identifiers) may be provided by the RAN by dedicated signaling and/or broadcast signaling. Dedicated parameters can only be sent to the terminal which has a valid Radio Resource Control (RRC) connection to the 3GPP RAN. A terminal which has received dedicated parameters applies dedicated parameters; otherwise the terminal applies the broadcast parameters. If no RRC connection is established between the terminal and the RAN, the terminal cannot receive dedicated parameters.

In some scenarios, the terminal may continue to apply the dedicated parameters which have been received from the RAN when the terminal leaves a connected mode. 3GPP Release 12 describes that a terminal leaving a connected mode (e.g. entering IDLE mode RRC_IDLE in LTE, URA_PCH, CELL_PCH in UMTS) will continue to apply dedicated RAN assistance parameters for a limited time duration. In LTE the suggested name of a timer for this time duration is called T350. In UMTS the suggested name is T330. After the timer has expired, the terminal will discard RAN assistance parameters and starts applying broadcast parameters.

A document "Technical Specification Group Radio Access Network; Study on Wireless Local Area Network (WLAN)—3GPP radio interworking (Release 12)", 3GPP TR 37.834 3GPP, explored some possible ways of improving WLAN/3GPP interworking. Three possible solutions are described in this document. Solutions 1 and 2 describe that a terminal uses assistance parameters (broadcast or dedicated) to determine how to steer traffic, similar to 3GPP release 12 described above. Solution 3 describes that traffic steering of a terminal is controlled by the network using dedicated traffic steering commands. In a measurement control step, a terminal is configured with measurement procedures, including the identity of a target WLAN to be measured. The terminal is triggered to send a measurement report by rules set by the measurement control. The terminal then waits for a steering command message from the 3GPP network.

There is a need for an alternative method of interworking.

SUMMARY

An aspect provides a method at a terminal, the terminal being capable of communicating with a first wireless access network and with a second wireless access network. The method comprises receiving criteria from the first wireless access network. The criteria comprise reporting criteria and steering criteria. The method comprises determining when a trigger event occurs and starting a timer. The method comprises operating in a first mode for a first time period until expiry of the timer. The method comprises operating in a second mode after expiry of the timer, wherein operation in the second mode is different to operation in the first mode. One of the first mode and the second mode comprises a traffic steering mode in which the terminal directly steers at least some traffic when the steering criteria are met and the other one of the first mode and the second mode comprises a measurement reporting mode in which the terminal sends a measurement report when the reporting criteria are met and waits for a traffic steering instruction to steer at least some traffic to the first wireless access network or to the second wireless access network.

The trigger event may be the terminal leaving a connected mode with respect to the first wireless access network.

The trigger event may be the terminal receiving the criteria from the first wireless access network.

The reporting criteria and the steering criteria may be the same. If the reporting criteria and the steering criteria are the same, then the terminal may only receive a single set of criteria.

The reporting criteria and the steering criteria may be different.

The reporting criteria and the steering criteria may comprise a set of threshold values.

One of the first mode and the second mode may comprise a combination of the traffic steering mode and the measurement reporting mode and the other of the first mode and the second mode may consist of only one of the traffic steering mode or the measurement reporting mode.

The method may comprise receiving a timer value and using the timer value to determine the first time period.

The criteria received from the first wireless access network may be dedicated criteria, the method further comprising: determining expiry of a second time period; and upon expiry of the second time period, using broadcast criteria received in a broadcast transmission from the first wireless access network in place of the dedicated criteria.

The second time period may be less than the first time period.

The second time period may be longer than the first time period.

The criteria received from the first wireless access network may be dedicated criteria received from a first cell of the first wireless access network. The method may further comprise determining when the terminal is served by a new cell of the first wireless access network; and using broadcast criteria received in a broadcast transmission from the new cell of the first wireless access network in place of the dedicated criteria.

The method may comprise, when it is determined that the terminal is served by a new cell of the first wireless access network, forcing operation in the second mode irrespective of whether the timer has expired.

The method may comprise, when it is determined that the terminal is served by a new cell of the first wireless access network, forcing expiry of the timer and beginning operation in the second mode.

The method may comprise determining if an amount of traffic meets or exceeds a traffic threshold; and directly steering traffic in the traffic steering mode or sending a measurement report in the measurement reporting mode only if the amount of traffic meets or exceeds the traffic threshold.

The traffic steering mode may comprise: determining metrics with respect to the first wireless access network and a second wireless access network; comparing the metrics with steering criteria; and steering at least some traffic to the first wireless access network or to the second wireless access network when the steering criteria are met.

The measurement reporting mode may comprise: determining metrics with respect to the first wireless access network and a second wireless access network; comparing the metrics with reporting criteria; and sending a measurement report for steering when the reporting criteria are met.

Another aspect provides a terminal which is capable of communicating with a first wireless access network and with a second wireless access network. The terminal is configured to receive criteria from the first wireless access network, the criteria comprising reporting criteria and steering criteria. The terminal is configured to determine when a trigger event occurs and starting a timer. The terminal is configured to operate in a first mode for a first time period until expiry of the timer. The terminal is configured to operate in a second mode after expiry of the timer, wherein operation in the second mode is different to operation in the first mode. One of the first mode and the second mode comprises a traffic steering mode in which the terminal is configured to directly steer at least some traffic when the steering criteria are met and the other one of the first mode and the second mode comprises a measurement reporting mode in which the terminal is configured to send a measurement report when the reporting criteria are met and waits for a traffic steering instruction to steer at least some traffic to the first wireless access network or to the second wireless access network.

The terminal may be configured to perform any of the described or claimed methods.

Another aspect provides a method at a node of a first wireless access network. The method comprises sending criteria to a terminal served by the first wireless access network, the criteria comprising reporting criteria and steering criteria. The method comprises sending the terminal a timer value which defines a first time period, wherein the terminal is operable in a first mode from a start of the idle mode until expiry of a timer having the timer value, and the terminal is operable in a second mode after expiry of the timer, wherein operation in the second mode is different to operation in the first mode. One of the first mode and the second mode comprises a traffic steering mode in which the terminal directly steers at least some traffic when the steering criteria are met and the other one of the first mode and the second mode comprises a measurement reporting mode in which the terminal sends a measurement report when the reporting criteria are met and waits for a traffic steering instruction to steer at least some traffic to the first wireless access network or to a second wireless access network.

The method may further comprise sending a message to the terminal to cause the terminal to leave a connected mode with respect to the first wireless access network.

The reporting criteria and the steering criteria may be the same.

The reporting criteria and the steering criteria may be different.

The reporting criteria and the steering criteria may comprise a set of threshold values.

Another aspect provides apparatus for use at a node of a first wireless access network. The apparatus is configured to send criteria to a terminal served by the first wireless access network, the criteria comprising reporting criteria and steering criteria. The apparatus is configured to send the terminal a timer value which defines a first time period, wherein the terminal is operable in a first mode from a start of the idle mode until expiry of a timer having the timer value, and the terminal is operable in a second mode after expiry of the timer, wherein operation in the second mode is different to operation in the first mode. One of the first mode and the second mode comprises a traffic steering mode in which the terminal is configured to directly steer at least some traffic when the steering criteria are met and the other one of the first mode and the second mode comprises a measurement reporting mode in which the terminal is configured to send a measurement report when the reporting criteria are met and wait for a traffic steering instruction to steer at least some traffic to the first wireless access network or to a second wireless access network.

In any of these examples, all or only some traffic may be steered. One possible granularity of steering is that all traffic for the terminal may be steered between wireless access networks.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable medium can be a non-transitory machine-readable medium. The term "non-transitory machine-readable medium" comprises all machine-readable media except for a transitory, propagating signal. The machine-readable instructions can be downloaded to the storage medium via a network connection.

Thus, steering of the terminal is carried out efficiently.

BRIEF DESCRIPTION OF THE DRAWINGS

Embodiments of the invention will be described, by way of example only, with reference to the accompanying drawings in which.

DETAILED DESCRIPTION

Figure 1:
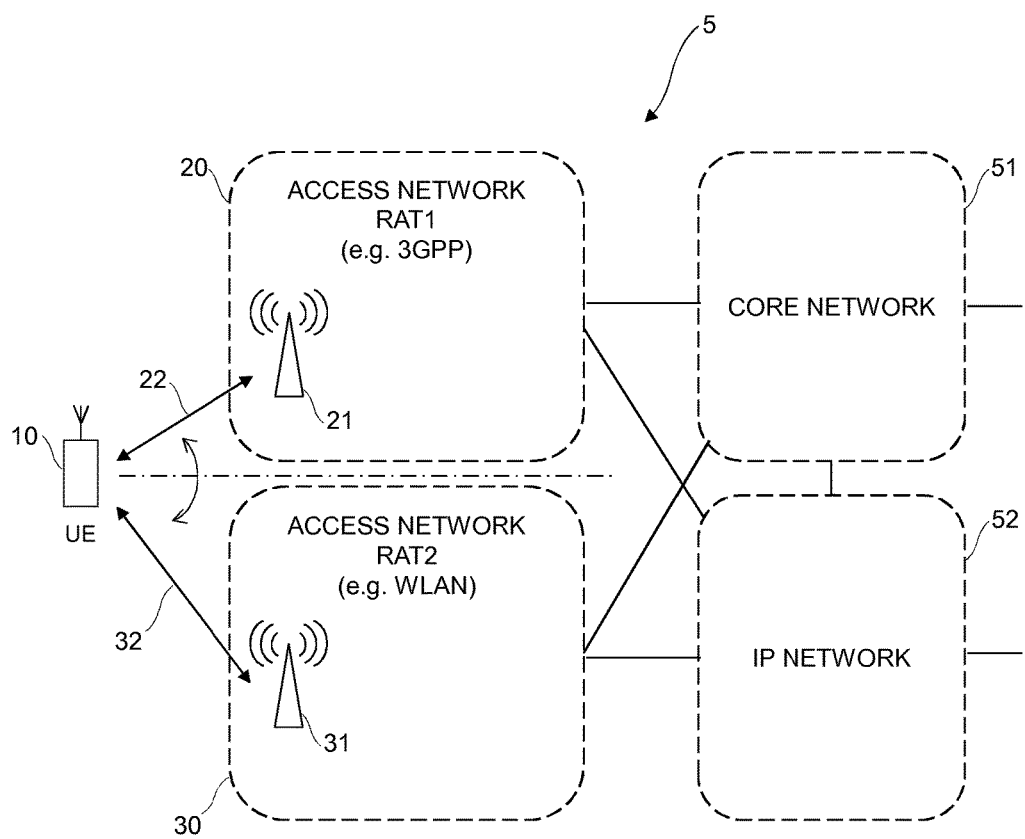
FIG. 1 shows a system with two networks having different radio access technologies.

FIG. 1 shows an example communications system 5 with a first wireless access network 20 and a second wireless access network 30. The first wireless access network 20 uses a first radio access technology (RAT). The second wireless access network 30 uses a second radio access technology. The first radio access technology is different to the second radio access technology. The first radio access technology can be a 3GPP technology, such as LTE, UMTS or GSM and the second radio access technology can be a non-3GPP radio access technology, such as WLAN (Wi-Fi) or WiMAX. WLAN technology is described in IEEE 802.11 standards. WiMAX is described in IEEE 802.16. In other examples, the first radio access technology and the second radio access technology can be different 3GPP RATs, such as UMTS and LTE.

In the following examples, the first radio access technology is a 3GPP RAT and the second radio access technology is WLAN. A terminal 10 is capable of communicating 22 with the first wireless access network 20 and is also capable of communicating 32 with the second wireless access network 30. A terminal is generally called a user equipment (UE) in 3GPP standards and a station (STA) in WLAN documents. Non-limiting examples of terminals 10 include wireless telephones, smart phones, tablets, portable computers, media players. Although only one terminal 10 is shown in FIG. 1 it will be understood that a system can serve a large number of terminals 10.

In a 3GPP network 20, communication 22 is between the terminal 10 and a base station 21. In 3GPP terminology, a base station 21 is called a base transceiver station (BTS), NodeB (UMTS) or an eNodeB (LTE). Base stations configured for smaller coverage areas, such as femtocells, are called Home Node B (HNB) or Home eNodeB (HeNB). In a WLAN network, communication 32 is between the terminal 10 and an access point (AP) 31. Other elements of the wireless access networks 20, 30 are not shown for clarity.

The first wireless access network 20 may be connected to a core network 51 and/or to an IP network 52. The second wireless access network 30 may be connected to the core network 51 and/or to an IP network 52. In some examples, the operator of the first wireless access network 20 may own, or have an agreement to use, the second wireless access network 30. In some examples, the second wireless access network 30 may be integrated with the first wireless access network. The term "operator-controlled Wi-Fi" indicates a Wi-Fi deployment that on some level is integrated with a cellular network operators existing network. The first wireless access network 20 may provide to the terminal 10 a list of identifiers of WLANs that belong to the operator of the first wireless access network (or partners). The terminal 10 may be configured to only consider WLANs which correspond to an entry in the list of identifiers. The terminal 10 may also be capable of over-riding that list to use, for example, a home WLAN.

Figure 2:
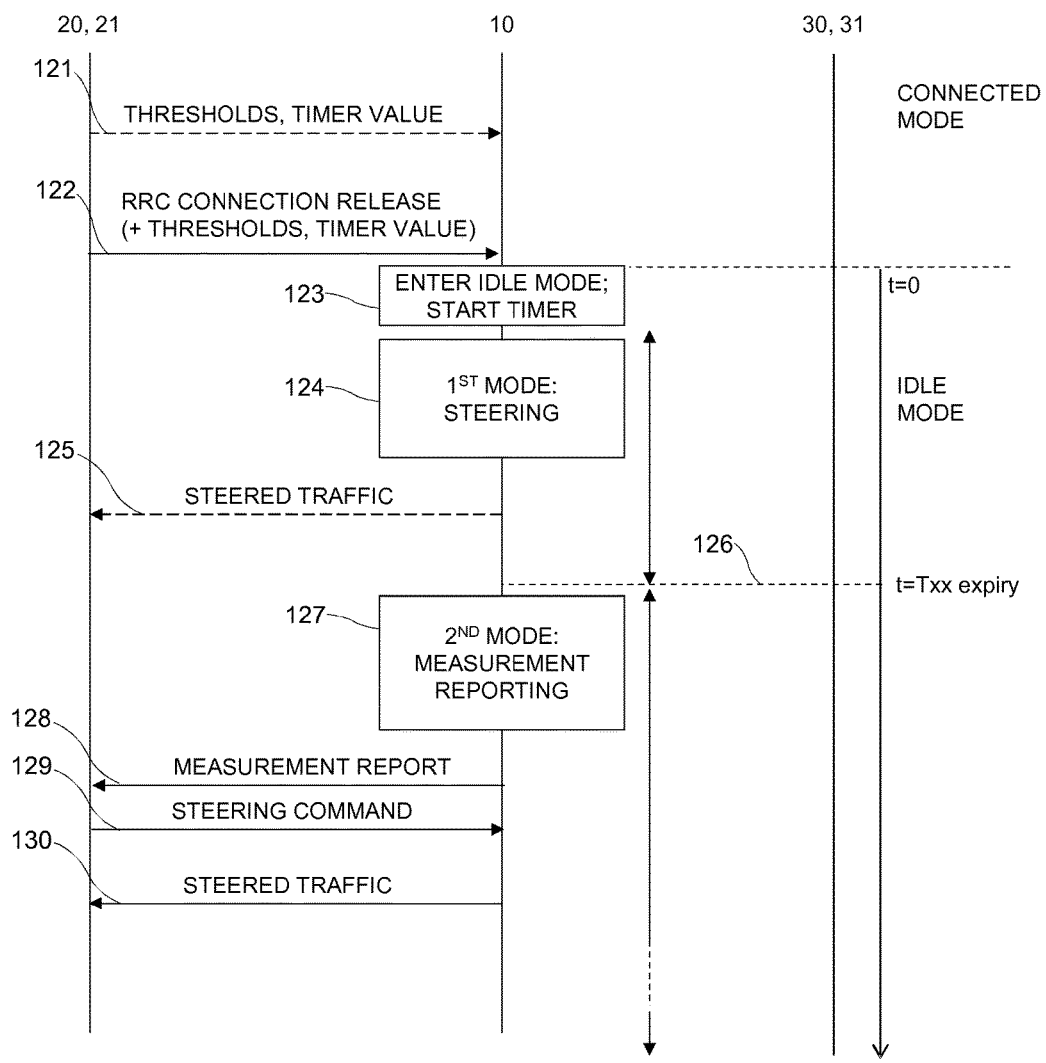
FIG. 2 shows an example of interworking with a traffic steering mode followed by a measurement reporting mode.

FIG. 2 shows a first example of interworking between the terminal 10, the first wireless access network 20, 21 and the second wireless access network 30, 31. Initially, the terminal 10 is in a connected mode with respect to the first wireless access network 21. At some point 121, 122 before the terminal 10 leaves the connected mode, the terminal may receive assistance information from the first wireless access network 21. This assistance information will be called criteria in this disclosure. The criteria can comprise steering criteria and reporting criteria. The "steering criteria" is one or more criteria which is used by the terminal when operating in a direct steering mode. The "reporting criteria" is one or more criteria which is used by the terminal when operating in a measurement reporting mode. The steering criteria and reporting criteria may be the same. If the steering criteria and reporting criteria are the same, only a single set of criteria may be sent to the terminal. In some examples, the criteria comprises thresholds. The thresholds are threshold values of metrics.

The thresholds can define threshold values of 3GPP signal-related metrics such as one or more of: Reference Signal Received Power (RSRP); Reference Signal Received Quality (RSRQ); Received Signal Code Power (RSCP); received energy per chip of the pilot channel divided by the total noise power density (Ec/No). The thresholds can define values of non-3GPP signal-related metrics such as WLAN Received Carrier Power Indicator (RCPI), WLAN Received Signal Strength Indicator (RSSI). The thresholds can define values of other metrics such as: WLAN load/utilization;

WLAN backhaul load/capacity. The thresholds can be associated with a particular steering direction, e.g. 3GPP to WLAN.

Different thresholds can be provided for each steering direction: (i) one or more thresholds for the steering direction 3GPP to WLAN and (ii) one or more thresholds for the steering direction WLAN to 3GPP. The thresholds can be the same as, or similar to, the thresholds defined in 3GPP release 12. Examples of suitable thresholds are described in 3GPP TS 36.304, version 12.2.0 Release 12 at section 5.6.3.

The criteria sent to the terminal may also comprise conditions or rules which should be met for steering to occur in the direct steering mode, or for the terminal to send a measurement report in the measurement reporting mode.

The terminal 10 may also receive a timer value from the first wireless access network 21. This timer value is used with a timer which is called "Txx" in this disclosure. The timer Txx is used to define a time period during which the terminal 10 will operate in a first mode after leaving a connected mode, or a trigger event. The timer value of timer Txx can be a network configurable variable.

In FIG. 2, the terminal may receive the thresholds when the terminal leaves a connected mode. For example, the thresholds may be received 122 with a RRC Connection Release message from the first wireless access network 20, 21. The RRC Connection Release message signals the end of the connected mode. Alternatively, the terminal may receive the thresholds at an earlier point in time 121 while the terminal is in the connected mode with respect to the first wireless access network 20, 21. The timer value Txx may be received with the thresholds. Alternatively, the timer value Txx may be received separately from the thresholds. The thresholds may comprise a single set of thresholds, or two sets of thresholds. In some examples, receiving the criteria comprises corresponds to receiving information indicating the criteria, e.g. indicating the threshold or indicating the threshold and associated metric.

At block 123 the terminal 10 enters an idle mode with respect to the first wireless access network 20, 21. This is a trigger event for the terminal to begin operating according to a first mode 124. The terminal starts a timer to determine how long the terminal has been operating in the first mode. In this first mode, the terminal uses the thresholds (received at 121 or 122) to directly steer traffic. The term "directly steer" means that the terminal makes a decision of whether to steer traffic based on metrics and the received threshold values, without sending a measurement report and waiting for a steering decision from an external entity, such as a base station or controller in the first wireless access network 20, 21.

For direct steering the determination to steer is not under network control. The steering is carried out automatically from a determination made by the terminal, e.g. when a threshold is determined by the terminal to be met. In some aspects, when the criteria (i.e. steering criteria) are met, the terminal is configured to start a steering process without receiving a steering command from the first (or second) access network. This can be described as autonomous steering, because the terminal decides for itself (i.e. autonomously) how to steer traffic, using conditions/rules stored at the terminal. This type of traffic steering includes threshold based steering as described in 3GPP TS 36.304, version 12.2.0 Release 12 at section 5.6 "RAN-assisted WLAN interworking".

As described above, the terminal directly steers traffic in the first mode. In some examples, directly steering is steering autonomously by the terminal. By directly steering, the terminal does not send a measurement report initially and wait for a network instruction to initiate connection.

The terminal may directly steer traffic only to the first wireless access network if the conditions for a return to the first wireless access network are met. Alternatively, the terminal may directly steer traffic to the first wireless access network or the second wireless access network depending on whether the conditions for a return to the first wireless access network or the second wireless access network are met.

The terminal may already have an established connection, or association, with a WLAN during this method. The purpose of performing the method is to determine if traffic should be steered to the 3GPP network instead of, or in addition to, the WLAN.

The terminal determines metrics of one or more signals received from the first wireless access network 20, 21 and from the second wireless access network 30, 31. The metrics can be determined by measuring signals, such as by measuring signal strength or signal quality. The metrics may be determined by receiving information from one of the wireless access networks, such as information about loading or backhaul capacity of the wireless access network. The metrics are compared with the threshold values provided by the first wireless access network. In some cases, the metric may have to be greater than a threshold value for steering to occur, e.g. measured RSRP of 3GPP signal is greater than a RSRP threshold to steer traffic to 3GPP. In some cases, the metric may have to be less than a threshold value for steering to occur, e.g. 3GPP loading is less than a 3GPP loading threshold to steer traffic to 3GPP.

The terminal uses one or more conditions/rules to determine whether to steer traffic. An example of a single condition is measured RSRP of 3GPP signal is greater than a RSRP threshold to steer traffic to 3GPP. An example of a plurality of conditions being required to perform steering is: (i) measured 3GPP signal is greater than a RSRP threshold and (ii) WLAN signal is less than a WLAN RSSI threshold to steer traffic to 3GPP. Some example rules/conditions for traffic steering are described in 3GPP TS 36.304 Release 12 at section 5.6.2. The threshold values received from the first wireless access network 20, 21 are used in the rules/conditions. The conditions/rules used to determine whether to steer traffic can be pre-stored at the terminal, or sent to the terminal as part of the steering criteria.

Traffic steering 125 may, or may not, occur during the first mode of operation. This will depend on whether the steering criteria are met. If the terminal determines, during the first mode, that traffic steering should occur to the first wireless access network, the terminal establishes a RRC connection with the first wireless access network.

At time t=Txx expiry, 126, after entering the idle mode (i.e. time t=Txx expiry after leaving the connected mode) the timer at the terminal expires. When the timer at the terminal expires, operation of the terminal changes. The terminal changes to operate according to a second mode 127. In this second mode, the terminal does not directly steer traffic. Instead, the terminal determines when reporting criteria for sending a measurement report are met. The terminal sends a measurement report when the reporting criteria are met and waits for a steering decision. The decision is made by an external entity such as a base station or controller of the first wireless access network. The measurement report is for the purpose of providing the first wireless access network with information to assist network-controlled traffic steering between wireless access networks. Thus, in the first mode steering is carried out autonomously by the terminal, and in the second mode steering is carried out under network control. In some aspects, steering is only permitted by the single procedure described when the terminal is in the first mode or in the second mode.

Similar to the direct steering mode, the terminal determines metrics of one or more signals received from the first wireless access network 20, 21 and from the second wireless access network 30, 31. The metrics can be determined by measuring signals, such as by measuring signal strength or signal quality. The metrics may be determined by receiving information from one of the wireless access networks, such as information about loading or backhaul capacity of the wireless access network. The metrics are compared with the threshold values provided by the first wireless access network.

The terminal uses one or more conditions/rules to determine whether to send a measurement report. An example of a single condition is measured RSRP of 3GPP signal is greater than a RSRP threshold to send a measurement report. An example of a plurality of conditions being required to send a measurement report is: (i) measured 3GPP signal is greater than a RSRP threshold and (ii) WLAN signal is less than a WLAN RSSI threshold. Some example rules/conditions for traffic steering are described in 3GPP TS 36.304 Release 12 at section 5.6.2. The threshold values received from the first wireless access network 20, 21 are used in the rules/conditions. The conditions/rules used to determine whether to steer traffic can be pre-stored at the terminal, or sent to the terminal as part of the reporting criteria.

At 128, the terminal sends a measurement report. The measurement report may include all, or some of, the metrics determined by the terminal. This information can assist the network in making a steering decision. The measurement report may be sent directly to the first wireless access network 20, 21. The terminal then waits for a traffic steering instruction from the first wireless access network 20, 21. The network uses information in the measurement report to determine how to steer traffic. FIG. 2 shows the first wireless access network 20, 21 sending a steering command 129 to the terminal. The terminal then steers traffic. The steering command received at 129 may command steering to the first wireless access network 20, 21 or to the second wireless access network 30, 31. The traffic is steered by the terminal at block 130. In some examples, the terminal determines to send the measurement report when thresholds are met which indicate steering should be carried out. Traffic may be steered to a combination of the first wireless access network 20, 21 and the second wireless access network 30, 31.

In one possible implementation of the method shown in FIG. 2, the criteria received 121, 122 prior to leaving connected mode may comprise a single set of thresholds. Each threshold specifies a threshold value of a particular metric. In the first mode 124, these metrics may be used for evaluating when to perform steering and, after Txx expiry, is used for evaluating when to perform measurement reporting. The terminal may use a first sub-set of the thresholds in the first mode 124 and use a second sub-set of the thresholds in the second mode 127. The second sub-set of thresholds partially overlaps with the first sub-set of thresholds. For example, if the terminal has been provided with thresholds for WLAN signal strength and for WLAN BSS load, the terminal may apply both of these thresholds when evaluating whether to directly steer traffic in the first mode 124. However, when the terminal is evaluating whether to send a measurement report in the second mode 127 it may apply only the threshold for WLAN signal strength.

In another possible implementation of the method shown in FIG. 2, the criteria received 121, 122 prior to leaving connected mode may comprise a first set of thresholds S1 and a second set of thresholds S2. In the first mode 124, the terminal performs traffic steering using the first set of thresholds S1. After Txx expiry, the terminal determines when to steer traffic using the second set of thresholds S2. As such, the metrics measured by the terminal and the thresholds used in relation to steering may be the same or different between the first and second modes.

In the first mode of the above method, the terminal 10 is only enabled to perform direct traffic steering and is prohibited from performing measurement reporting. In the second mode of the above method, the terminal 10 is only enabled to perform measurement reporting and is prohibited from performing direct traffic steering.

In the above method, the action of the terminal is to directly steer traffic if the thresholds are fulfilled before the expiry of Txx and to send a measurement report if the thresholds are fulfilled when Txx has expired. If a relatively short time has elapsed since the terminal has entered idle mode, it is likely that the thresholds provided by the network are still current, and direct steering can result in the best steering of the traffic. This can achieve a good steering of traffic with minimal signalling between the terminal and the first network, and a faster offloading of the traffic. After Txx has expired, there is a higher probability that the thresholds do not accurately reflect the current network conditions. Therefore, operating in the measurement reporting mode has an advantage of ensuring a better steering decision. While the measurement reporting mode has a penalty of requiring additional signalling exchanges between the terminal and the first wireless access network, the overall signalling is less than would be required to move traffic due to an incorrect direct traffic steering decision of a terminal. This is because the network may need to command the terminal to offload the traffic again.

In any of these examples, all or only some traffic may be steered. One possible granularity of steering is that all traffic for the terminal may be steered between wireless access networks. Another possible granularity is that a certain flow for a service is steered while another flow is not steered. Consider, for example, that the video-part of a video-conference is steered to one access while the voice-part is steered to another access. With an even higher granularity it would be possible to steer certain parts of a flow, e.g. some packets in a traffic flow are routed over one wireless access network while some other packets in a traffic flow are routed over another wireless access network.

Figure 3:
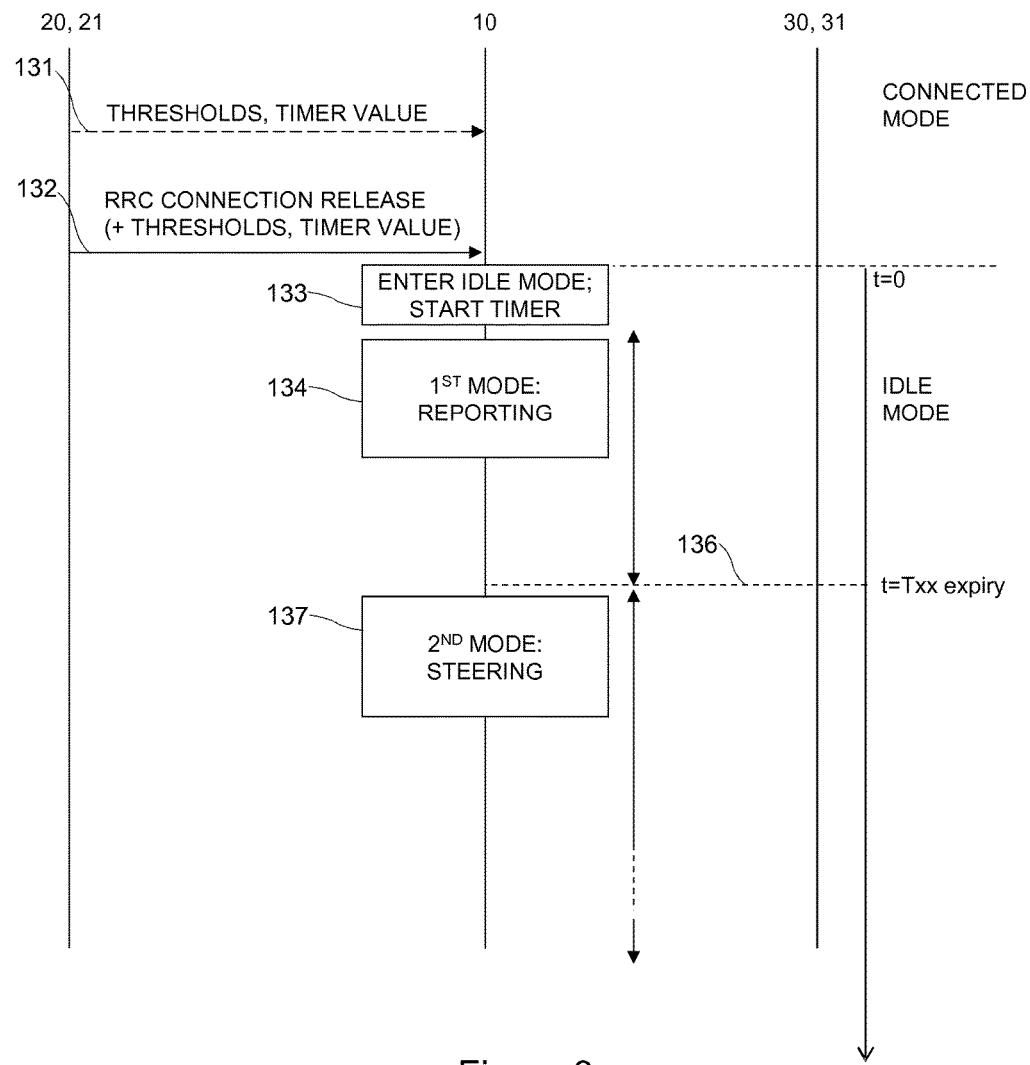
FIG. 3 shows an example of interworking with a measurement reporting mode followed by a traffic steering mode.

FIG. 3 shows another example of interworking. The method is broadly the same as FIG. 2, apart from a swapping of the activities performed during the first mode and the second mode. In FIG. 3, the terminal is configured to perform measurement reporting in the first mode 134 and is configured to perform direct traffic steering in the second mode 137. The method begins in the same way as FIG. 2. At some point 131, 132 before the terminal 10 leaves the connected mode, the terminal may receive assistance information from the first wireless access network 20, 21. This assistance information can comprise a set of thresholds, or two sets of thresholds. The terminal 10 may also receive a timer value for timer Txx from the first wireless access network 20, 21. The timer Txx is used to define a time period during which the terminal 10 will operate in a first mode after leaving the connected mode. Other aspects of these initial stages are the same as described above for FIG. 2.

At block 133 the terminal 10 enters an idle mode with respect to the first wireless access network 21. The terminal operates according to a first mode 134. In this first mode, the terminal uses the thresholds (received at 131 or 132) for measurement reporting. Operation in this mode is the same as described above for FIG. 2, block 127.

At time t=Txx expiry, 136, after entering the idle mode (i.e. time t=Txx after leaving the connected mode) the timer at the terminal expires. Operation of the terminal changes. The terminal changes to operate according to a second mode 137. In this second mode, the terminal uses the thresholds (received at 131 or 132) to directly steer traffic.

As described above for FIG. 2, the terminal in the method shown in FIG. 3 may receive a single set of thresholds which is used for both modes, or two sets of thresholds.

In the method of FIG. 3, the action of the terminal is to send a measurement report during the period until t=Txx expiry. This can be useful, for example, to avoid frequent traffic steerings when there are significant changes in network conditions.

The selection of whether a terminal operates in the manner of FIG. 2, or FIG. 3, can be configured on a per terminal basis. One or more terminals can be configured to operate in the manner of FIG. 2, while one or more other terminals can be configured to operate in the manner of FIG. 3. Different terminals served by the same 3GPP cell can be configured differently. The configuration can be changed over time, as required.

The selection of whether a terminal operates in the manner of FIG. 2 or FIG. 3 can be configured on a per 3GPP cell basis. One cell can instruct terminals within that cell to operate in the manner of FIG. 2, while another cell can be configured to instruct terminals within that cell to operate in the manner of FIG. 3. Cell-level behavior can be configured, for example, via broadcast signalling to terminals.

Figure 4:
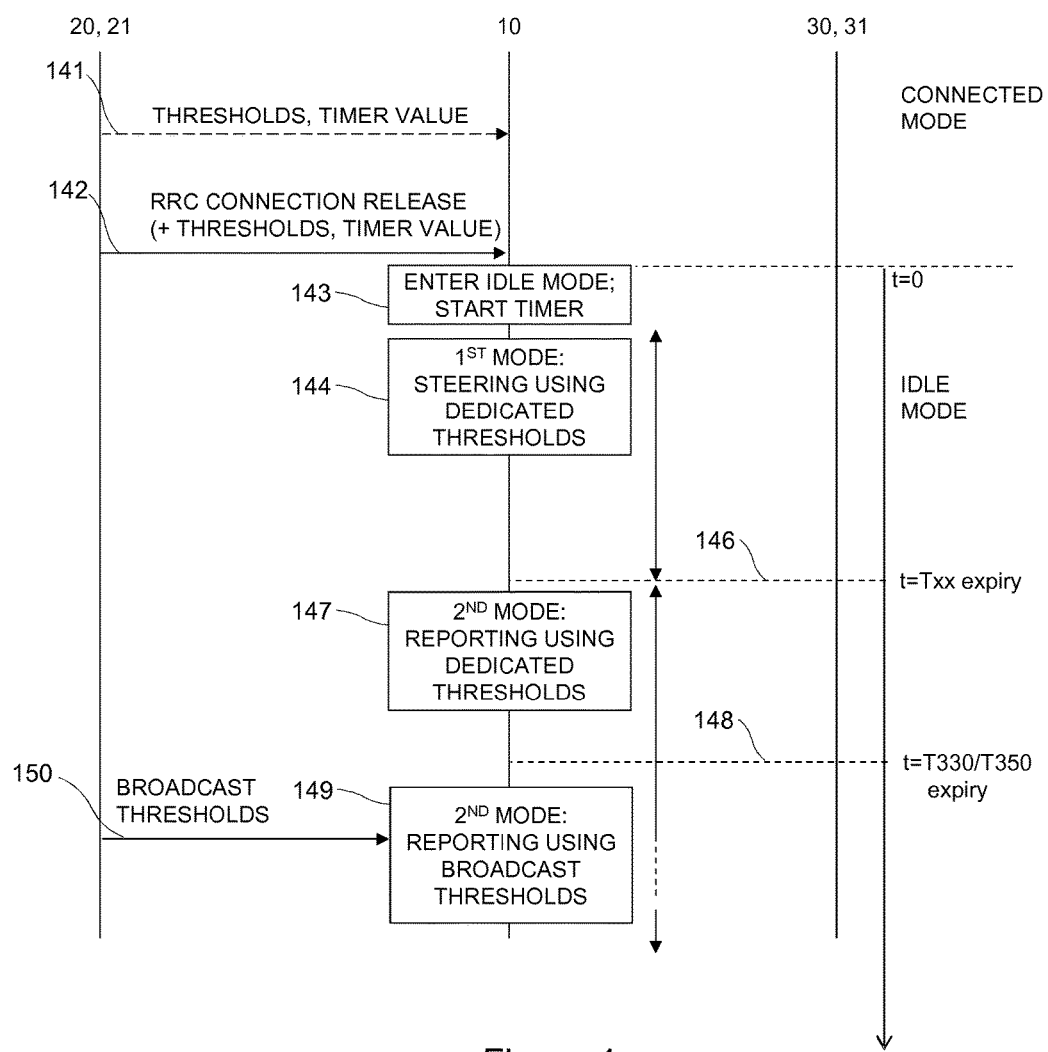
FIG. 4 shows two mode operation with a change to use broadcast thresholds during the second mode.
Figure 5:
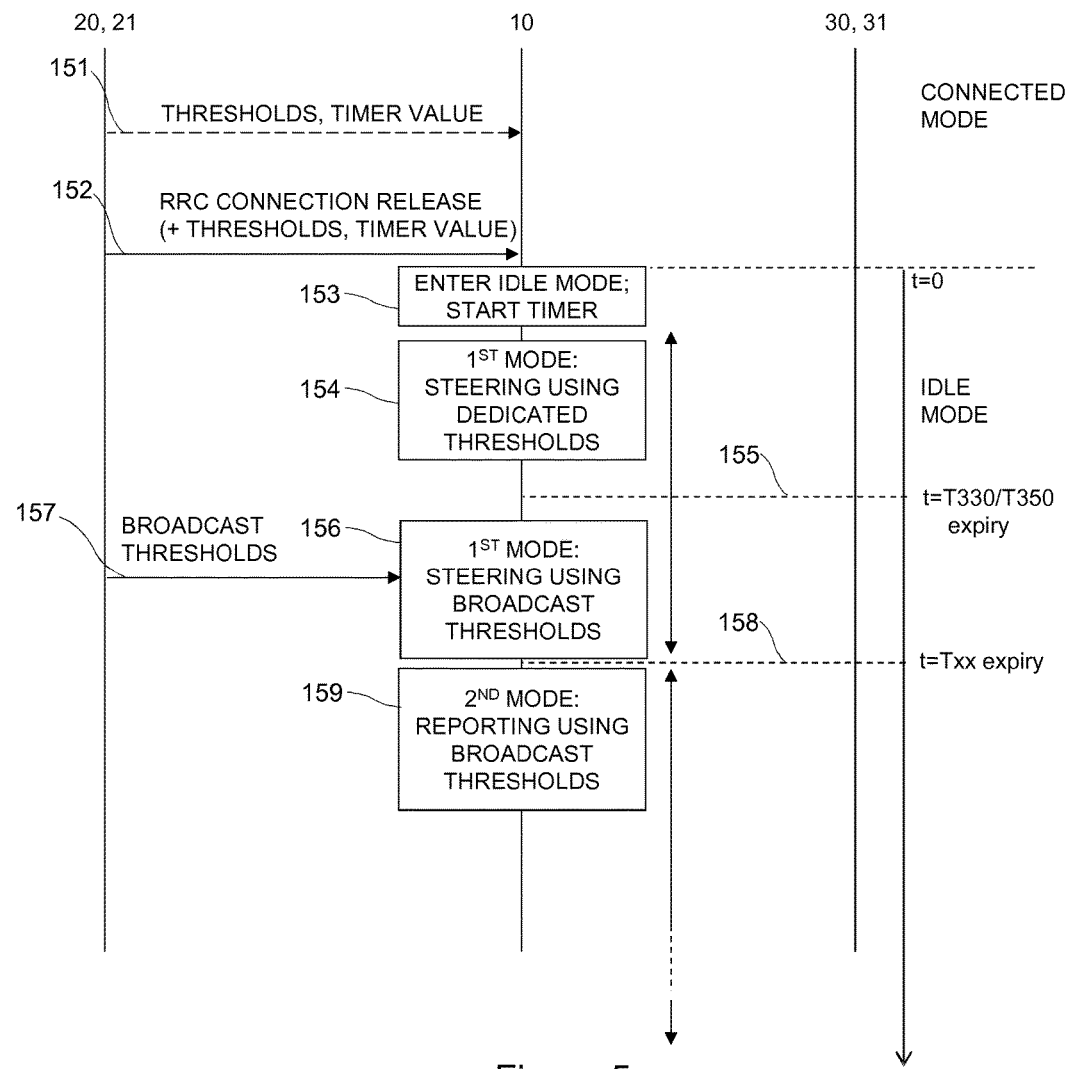
FIG. 5 shows two mode operation with a change to use broadcast thresholds during the first mode.

FIGS. 4 and 5 show some other examples of interworking. The methods are broadly the same as FIG. 2. In FIGS. 4 and 5, the operation of the terminal as described above is further modified based on a timer T330/T350. The T330/T350 timer is defined in 3GPP release 12. Until the timer T330/T350 expires, the terminal uses dedicated thresholds. After expiry of the timer T330/T350, the terminal uses broadcast thresholds. FIG. 4 shows an example where timer Txx expires before timer T330/T350. The method begins in the same way as described above for FIG. 2. In a first mode of operation 144 after leaving a connected mode 143, the terminal performs direct traffic steering using dedicated thresholds received at 141 or 142. After timer Txx expires at 146, the terminal operates in a second mode 147. The terminal performs measurement reporting using dedicated thresholds received at 141 or 142. At 148, timer T330/T350 expires. The terminal continues 149 to operate in the second mode. However, the terminal uses broadcast thresholds received 150 from the first wireless access network 20, 21.

FIG. 5 shows an example where timer Txx expires after timer T330/T350. The method begins in the same way as described above for FIG. 4. In a first mode of operation 154, after entering IDLE mode 153, the terminal performs direct traffic steering using dedicated thresholds received at 151 or 152. At 155, timer T330/T350 expires. The terminal continues 156 to operate in the second mode. However, the terminal uses broadcast thresholds received 157 from the first wireless access network 20, 21. After timer Txx expires at 158, the terminal operates 159 in a second mode. The terminal performs measurement reporting using broadcast thresholds received from the first wireless access network 20, 21.

FIGS. 4 and 5 show the method of FIG. 2 (direct traffic steering in the first mode, measurement reporting in the second mode) modified with the timer T330/T350. The method of FIG. 3 (measurement reporting in the first mode, direct traffic steering in the second mode) can be modified in the same way.

Figure 6:
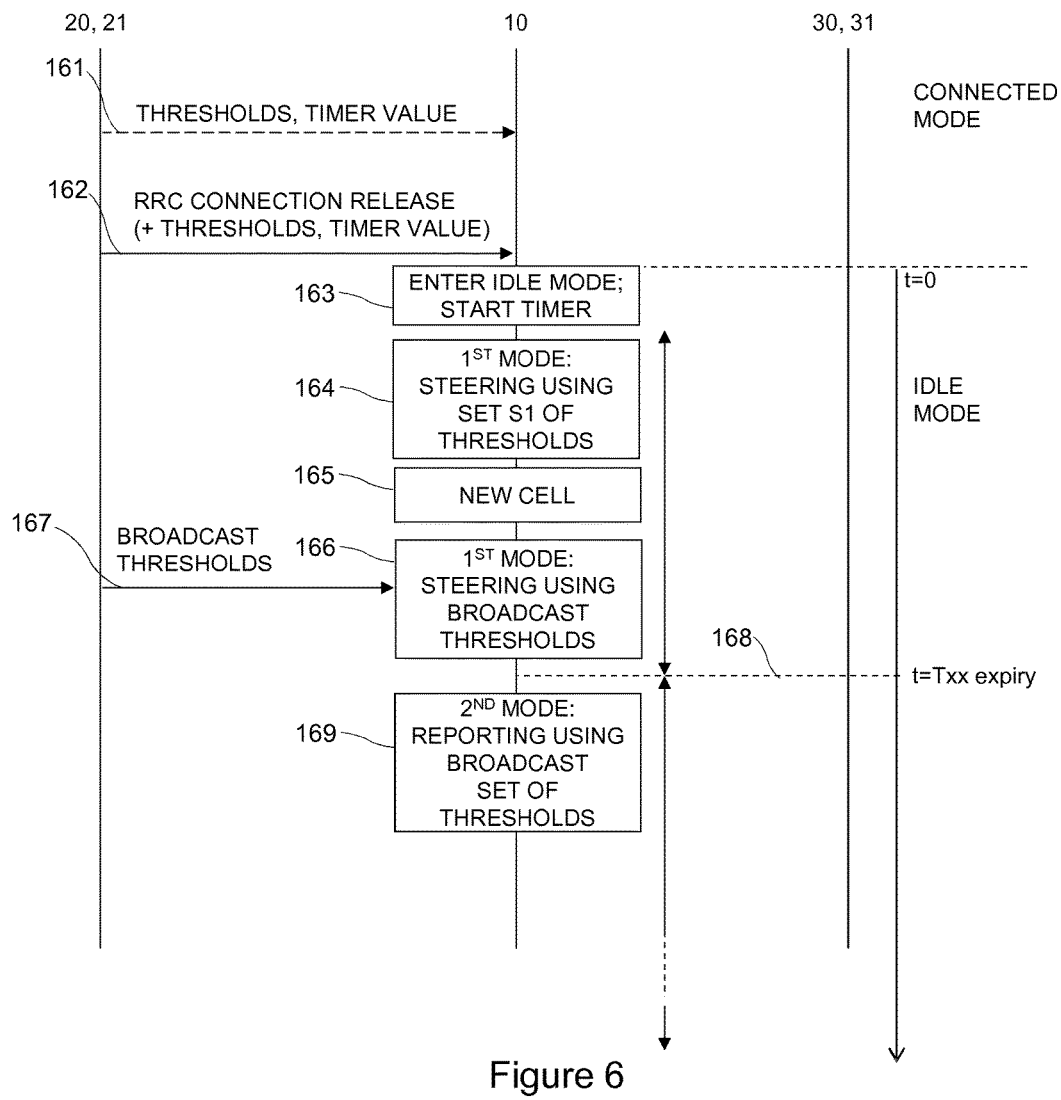
FIG. 6 shows two mode operation with a change of cell.
Figure 7:
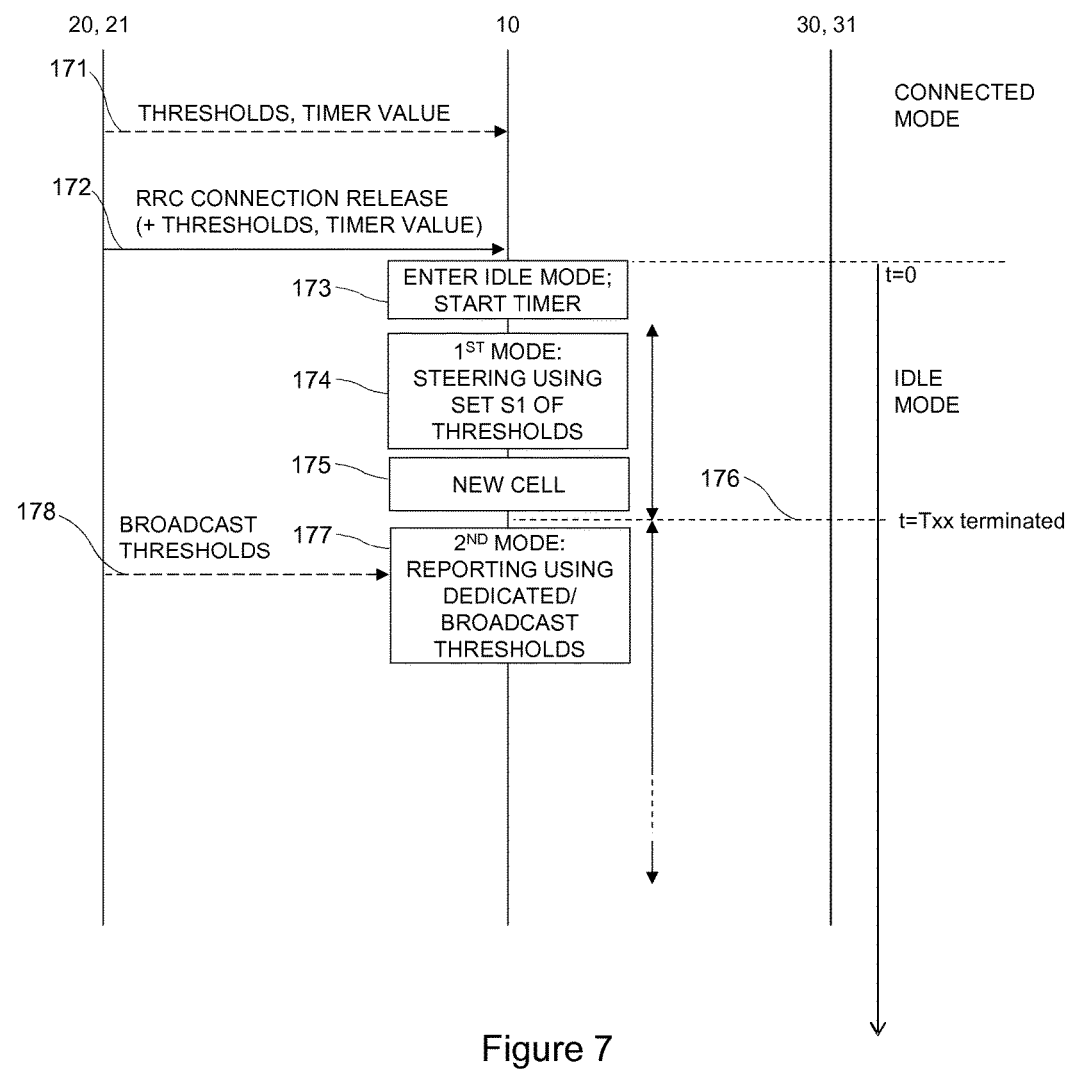
FIG. 7 shows two mode operation with a change of cell.

FIGS. 6 and 7 show other examples of interworking. In FIGS. 6 and 7, the operation of the terminal is modified when the terminal camps on a new cell. Typically, this is caused by the terminal moving out of the coverage area of an original cell and into the coverage area of the new cell. In FIG. 6, the terminal uses dedicated thresholds received 161 or 162 in the first mode 164 after entering IDLE state 163. The terminal moves to a new cell at block 165. After 165, the terminal continues to operate in the first mode 166, using broadcast thresholds 167 in place of the dedicated thresholds. At time Txx 168 the terminal operates in the second mode 169, and performs measurement reporting using the broadcast thresholds 167.

In some cases, there can be a considerable difference in the conditions of the cell the UE is camping now and the cell in which the UE went to idle mode in the first place. In FIG. 7, the terminal uses dedicated thresholds received 171 or 172 in the first mode 174 after entering IDLE state 173. The terminal moves to a new cell at block 175. After 175, the terminal stops the Txx timer 176 and immediately begins to operate in the second mode 177 and performs measurement reporting. The change of cell overrides the timer Txx, or can force expiry of the timer Txx. The terminal can either be configured to use the dedicated thresholds that were configured by the initial cell (i.e. only difference is that the terminal behaves as if timer Txx has expired), or the terminal can apply thresholds set by the new cell (e.g. via broadcast signalling 178).

FIGS. 6 and 7 show a method in which the terminal performs direct traffic steering in the first mode and measurement reporting in the second mode. The method of FIG. 6 or 7 can be modified such that the terminal performs measurement reporting in the first mode and direct traffic steering in the second mode.

Action after Sending Measurement Report

In the examples described above, the terminal sends a measurement report (128, FIG. 2) to the first wireless access network 20, 21 when thresholds are met. This section describes some possible actions after sending this measurement report.

In order to send a measurement report (128, FIG. 2), the terminal moves to a connected mode with respect to the first wireless access network 20, 21. The terminal may stay in the connected mode unless it subsequently receives a message from the first wireless access network 20, 21 commanding the terminal not to steer to 3GPP. Such a message can be a simple RRC Connection Release message, or it can be a new message. This new message may include other parameters, such as dedicated thresholds for steering and/or measurement reporting. This may be useful if, for example, there is a need to update the thresholds that the terminal is using.

A terminal which has moved to a connected mode with respect to the first wireless access network to send a measurement report (128, FIG. 2) can return to the idle mode if it does not receive a traffic steering message (129, FIG. 2) commanding the terminal to steer all, or part of, its traffic back to 3GPP within a certain duration. In LTE, the terminal returns to idle mode on the reception of an RRC Connection Release message from the network. This is normally based on a network configurable inactivity timer. So one possibility is for the eNB not to do anything new when it does not want the terminal to steer its traffic back to 3GPP. When the inactivity timer expires, normal operation will ensure the terminal goes back to idle mode. Another alternative is to configure the terminal with an inactivity timer value and the terminal will trigger the RRC Connection Release (for example, via a new RRC Connection Release Request message).

In one example, a terminal which has moved to a connected mode with respect to the first wireless access network to send a measurement report (128, FIG. 2) can start steering traffic to 3GPP unless it receives a message commanding it not to steer to 3GPP within a certain time duration. The terminal can be configured with a timer value corresponding to this time duration when it is in the connected mode. This reduces network signalling between the terminal and first wireless access network.

In any of the above examples, the terminal can steer traffic only if the terminal traffic exceeds a predetermined volume. This can help to avoid performing traffic steering, and the associated signalling overhead, for small volumes of data. The terminal can measure one or more quantities, such as an amount of data over a WLAN link. The measurement may be averaged over a time period. The terminal can be provided with a further threshold value, such as a data amount threshold value. If the measured data amount exceeds the data amount threshold value, the terminal can perform traffic steering by direct steering or by sending a measurement report and awaiting a steering instruction. The behaviour of the terminal, when the other threshold conditions for steering are fulfilled, depends on the measured amount of data traffic is flowing over a link to the WLAN 30, 31. For example, if there is no data traffic the terminal may refrain from going to connected mode to send measurement reports. As another example, the terminal will get to connected mode (either for just sending measurement reports or to do complete steering), if the amount of traffic flowing over the WLAN link (averaged over certain duration) is above a certain threshold. The terminal can be configured with the data amount threshold value, as well as any required averaging duration for the measurement, while the terminal is in Connected mode.

This aspect of the disclosure can be used with the two mode operation, or with a single mode operation (i.e. just direct steering, or just measurement reporting).

Trigger Event in Connected Mode

Figure 8:
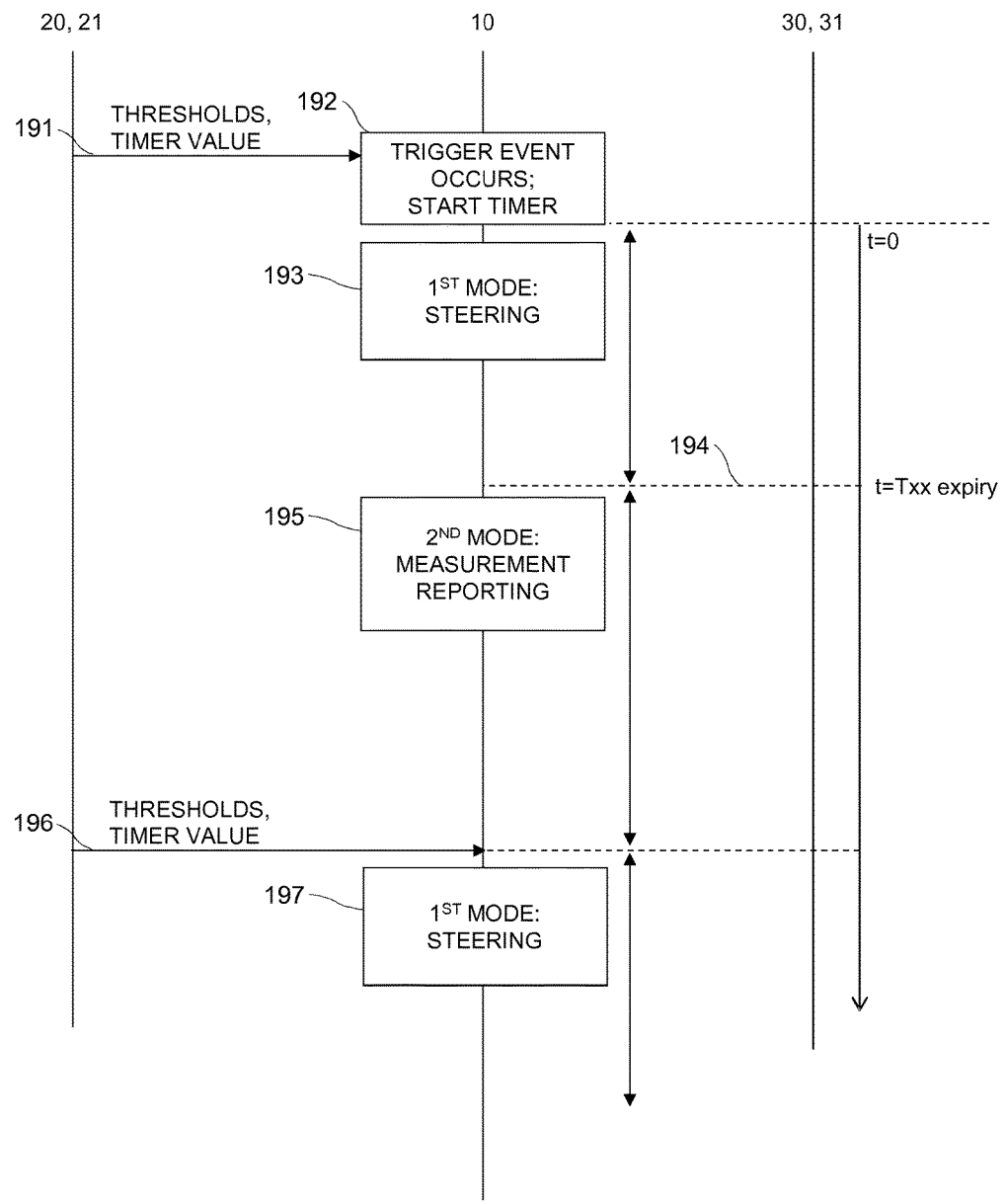
FIG. 8 shows an example of interworking with a traffic steering mode followed by a measurement reporting mode during connected mode.

In each of the examples described above, the terminal starts a timer Txx and begins operating in a first mode when the terminal enters idle mode. It is also possible to apply the manner of operation described in any of the above examples to a terminal which is in, and remains in, connected mode. FIG. 8 shows another example of interworking. In this example, a terminal is in connected mode and remains in connected mode. The terminal determines at block 192 when a trigger event occurs. The trigger event can be receiving criteria (e.g. a set of thresholds, or two sets of thresholds) 191 from the first wireless access network 20, 21. The terminal 10 may also receive a timer value Txx from the first wireless access network 20, 21. The timer value may be received at the same time as the thresholds, or separately from the thresholds.

At block 193 the terminal begins to operate according to a first mode 193. The terminal starts the timer Txx. In this first mode, the terminal uses the thresholds (received at 191) to directly steer traffic. Operation in the traffic steering mode is as explained above. At time t=Txx expiry, 194, after the trigger event occurred the timer at the terminal expires. Operation of the terminal changes. The terminal changes to operate according to a second mode 195. In this second mode, the terminal uses the thresholds (received at 191) for measurement reporting. Operation in the measurement reporting mode is as explained above. At a subsequent time, 196, the terminal receives a new set of thresholds. Optionally, the terminal receives a new timer value. The terminal begins to operate according to the first mode 197. The terminal repeats the sequence of events 194-196 described above. This causes the terminal to alternate between operating in the first mode and then operating in the second mode. After expiry of timer Txx, the terminal changes from the first mode to the second mode. Upon receiving new thresholds, the terminal changes from the second mode to the first mode.

An advantage of operating in the manner described above is that the terminal uses direct steering for a first period after receiving the thresholds. During this period, the thresholds are likely to be up-to-date and therefore traffic can be steered with minimal signalling overhead. After a longer time period, the thresholds may be out-of-date and not reflect the current conditions. Therefore, it is advantageous for the terminal to operate in the measurement reporting mode where the first wireless access network can make a steering decision based on up-to-date information.

As an alternative to FIG. 8, the first mode may be a measurement reporting mode and the second mode may be a traffic steering mode.

Direct Steering and Measurement Reporting in One Mode

Figure 9:
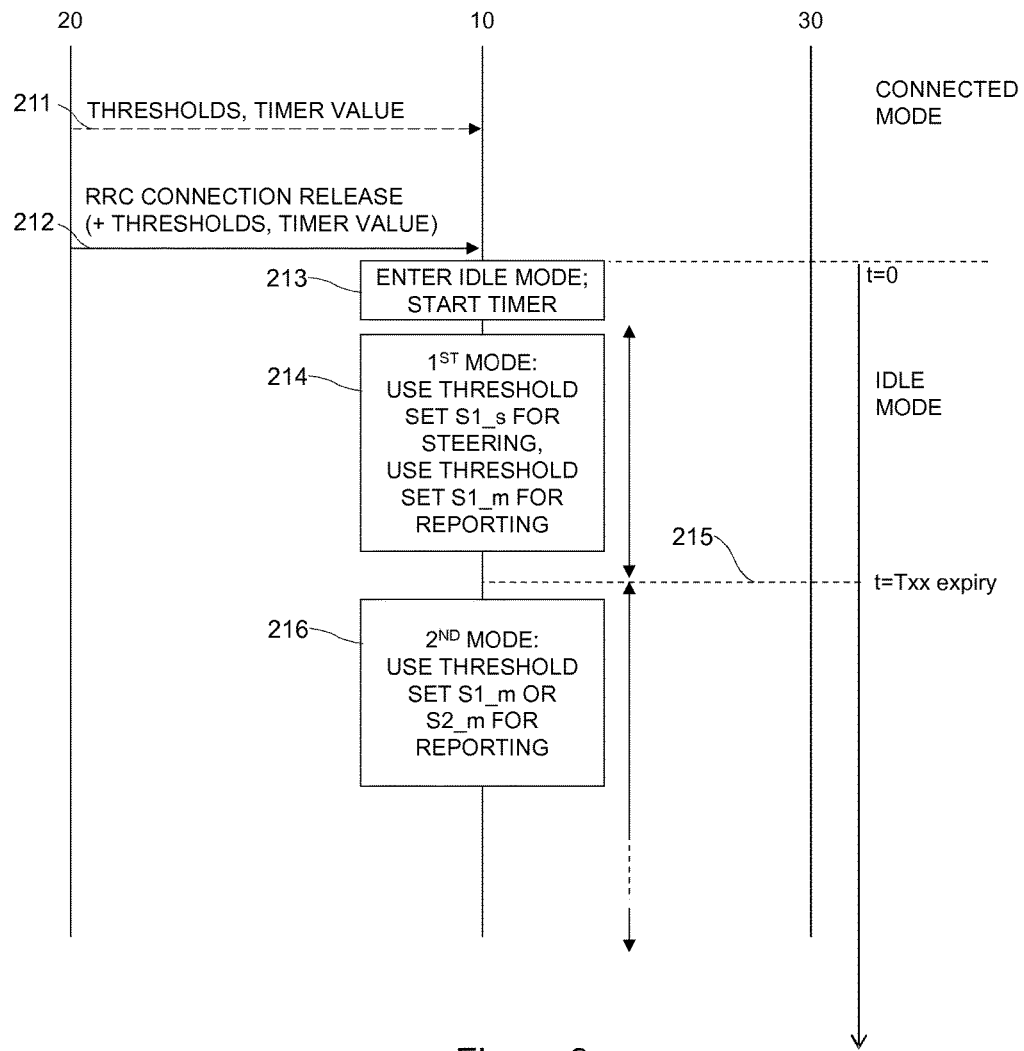
FIG. 9 shows traffic steering concurrent with measurement reporting in one of the two modes.

In the examples described above, the terminal 10 is enabled to perform only direct traffic steering or measurement reporting in the first mode (up to expiry of timer Txx) and the terminal is enabled to only perform the other of direct traffic steering or measurement reporting in the second mode (after expiry of timer Txx). The operation of the terminal is different in the first mode and the second mode. In other examples, the terminal 10 is enabled to perform direct traffic steering and measurement reporting in one of the modes and is enabled to only perform one of direct traffic steering or measurement reporting in the other of the modes. The operation of the terminal is different in the first mode and the second mode. FIG. 9 shows an example of operating in this way.

The first mode begins 214 when the terminal determines a trigger event has occurred 213, such as leaving connected mode, entering idle mode, or receiving criteria. The terminal is provided 211 or 212 with two sets of criteria:
 (i) criteria S1_s for direct traffic steering; and
 (ii) criteria S1_m for measurement reporting.

Each set S1_s, S1_m of criteria can comprise a set of threshold values of metrics. The criteria sent to the terminal may comprise conditions/rules, or the conditions/rules may be pre-stored at the terminal. In FIG. 9, the terminal determines metrics of signals received from the first wireless access network and the second wireless access network. The metrics may be determined by measuring signals, such as by measuring signal strength or signal quality. The metrics may be determined by receiving information from one of the wireless access networks, such as information about loading or backhaul capacity of the wireless access network. The metrics are compared with the threshold values S1_s and S1_m provided by the first wireless access network. The terminal uses one or more conditions/rules to determine whether to steer traffic or to send a measurement report. The threshold values received at 211 or 212 from the first wireless access network 20, 21 are used in the rules/conditions.

If comparison of the metrics with the threshold values of set S1_s meets the condition(s) of rules/conditions for direct steering, traffic is directly steered to the first wireless access network 21. If comparison of the metrics with the threshold values of set S1_m meets the condition(s) of rules/conditions for measurement reporting, the terminal sends a measurement report to the first wireless access network and awaits a steering command. In some examples, the two sets of thresholds are sufficiently different such that they will not be fulfilled concurrently. That is, either the conditions for direct traffic steering will be met, or the conditions for measurement reporting will be met.

At time t=Txx expiry, 215, after the trigger event, the timer at the terminal expires. Operation of the terminal changes. The terminal changes to operate according to a second mode 216. In this second mode, the terminal does not directly steer traffic. Instead, the terminal only determines when reporting criteria for sending a measurement report are met. The terminal sends a measurement report when the reporting criteria are met and waits for a steering decision. The decision is made by an external entity such as a base station or controller of the first wireless access network. In this second mode, the terminal can use the same set of thresholds S1_m as were used in the first mode, or can use a different set of thresholds S2_m. Alternatively, in the second mode the terminal may only directly steer traffic using thresholds S1_s or S2_s, and not send a measurement report for steering purposes.

Another possibility (not shown) is the reverse of what is shown in FIG. 9. The terminal is configured to only perform direct steering or measurement reporting in the first mode, and performs both direct steering and measurement reporting in the second mode.

Two Sets of Thresholds Concurrently

Figure 10:
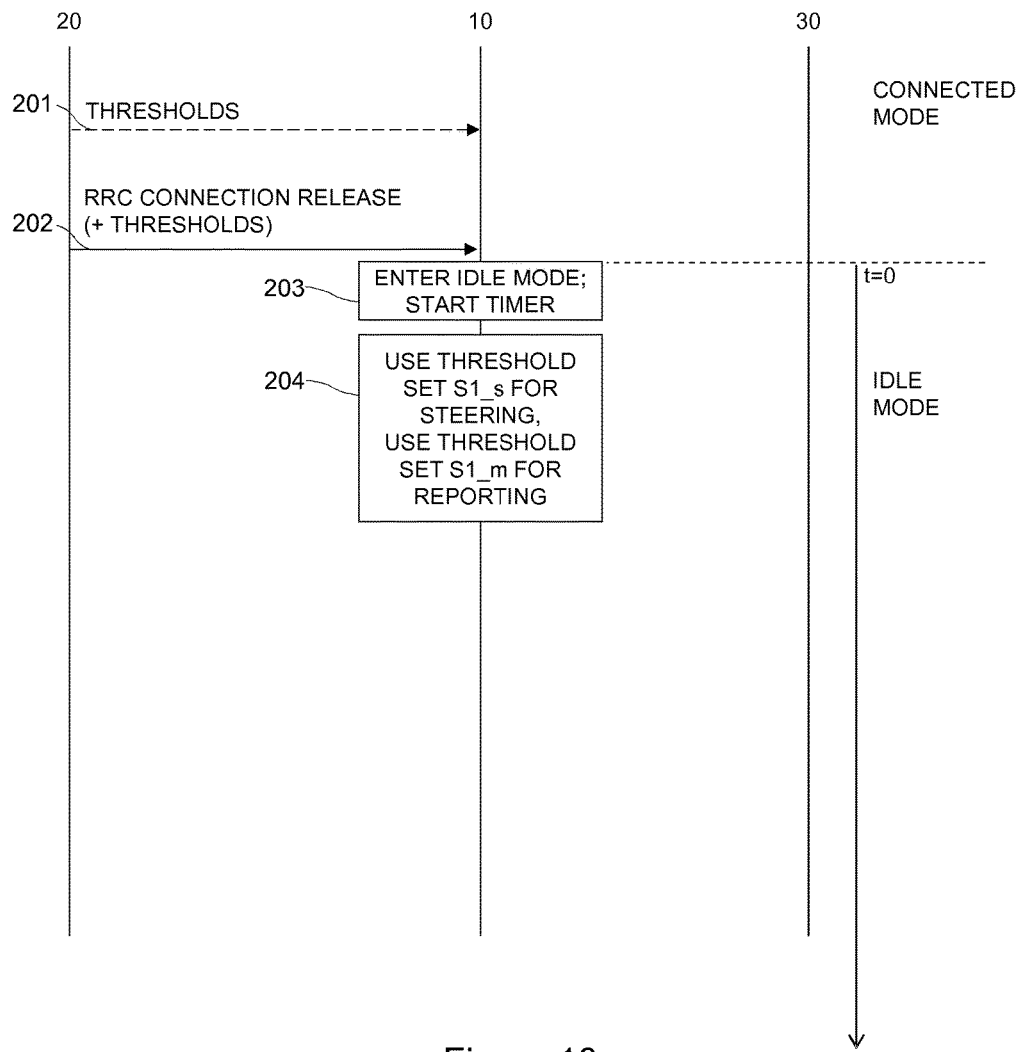
FIG. 10 shows traffic steering concurrent with measurement reporting.

FIG. 10 shows a more general example where a terminal concurrently uses two sets of criteria (e.g. thresholds). A terminal is provided 201 or 202 with two sets of criteria:
(i) criteria S1_s for direct traffic steering; and
(ii) criteria S1_m for measurement reporting.

Each set S1_s, S1_m of criteria can comprise a set of threshold values of metrics. The criteria sent to the terminal may comprise conditions/rules, or the conditions/rules may be pre-stored at the terminal. In FIG. 10, the terminal determines metrics of signals received from the first wireless access network and the second wireless access network after entering IDLE state 203. The metrics may be determined by measuring signals, such as by measuring signal strength or signal quality. The metrics may be determined by receiving information from one of the wireless access networks, such as information about loading or backhaul capacity of the wireless access network. The metrics are compared with the threshold values S1_s and S1_m provided by the first wireless access network. The terminal uses one or more conditions/rules to determine whether to steer traffic or to send a measurement report. The threshold values received at 201 or 202 from the first wireless access network 20, 21 are used in the rules/conditions.

If comparison of the metrics with the threshold values of set S1_s meets the condition(s) of rules/conditions for direct steering, traffic is directly steered to the first wireless access network 21. If comparison of the metrics with the threshold values of set S1_m meets the condition(s) of rules/conditions for measurement reporting, the terminal sends a measurement report to the first wireless access network and awaits a steering command. In some examples, the two sets of thresholds are sufficiently different such that they will not be fulfilled concurrently. That is, either the conditions for direct traffic steering will be met, or the conditions for measurement reporting will be met 204.

Figure 11:
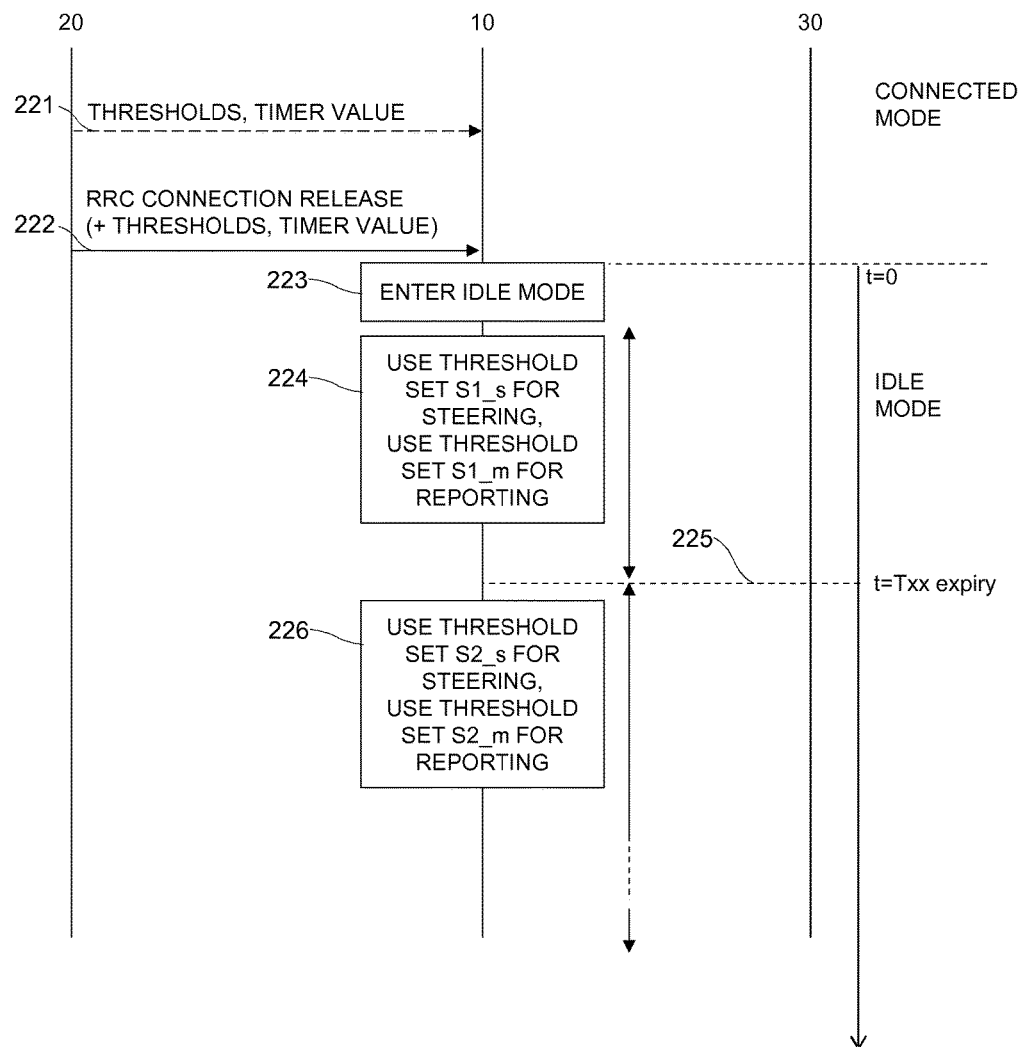
FIG. 11 shows traffic steering concurrent with measurement reporting and a change in threshold values.

In FIG. 11 the terminal operates in the same way as FIG. 10, but with different threshold values before and after expiry of a timer Txx. The terminal receives at 221 or 222 four sets of criteria:
(i) criteria S1_s of thresholds for direct traffic steering;
(ii) criteria S1_m of thresholds for measurement reporting;
(iii) criteria S2_s of thresholds for direct traffic steering; and
(iv) criteria S2_m of thresholds for measurement reporting.

The terminal also receives a value for timer Txx. From t=0 until expiry of the timer at t=Txx expiry, the terminal operates as described above for FIG. 10. The terminal determines metrics of signals received from the first wireless access network and the second wireless access network after entering IDLE state 223. The metrics may be determined by measuring signals, such as by measuring signal strength or signal quality. The metrics may be determined by receiving information from one of the wireless access networks, such as information about loading or backhaul capacity of the wireless access network. The metrics are compared 224 with the threshold values S1_s and S1_m provided by the first wireless access network. The terminal uses one or more conditions/rules to determine whether to steer traffic or to send a measurement report. The threshold values received at 221 or 222 from the first wireless access network 20, 21 are used in the rules/conditions.

If comparison of the metrics with the threshold values of set S1_s meets the condition(s) of rules/conditions for direct steering, traffic is directly steered to the first wireless access network 21. If comparison of the metrics with the threshold values of set S1_m meets the condition(s) of rules/conditions for measurement reporting, the terminal sends a measurement report to the first wireless access network and awaits a steering command.

After expiry of time Txx 225, the terminal determines metrics of signals received from the first wireless access network and the second wireless access network. The metrics may be determined by measuring signals, such as by measuring signal strength or signal quality. The metrics may be determined by receiving information from one of the wireless access networks, such as information about loading or backhaul capacity of the wireless access network. The metrics are compared 226 with the threshold values S2_s and S2_m provided by the first wireless access network. The terminal uses one or more conditions/rules to determine whether to steer traffic or to send a measurement report. The threshold values received from the first wireless access network 20, 21 are used in the rules/conditions.

If comparison of the metrics with the threshold values of set S2_s meets the condition(s) of rules/conditions for direct steering, traffic is directly steered to the first wireless access network 21. If comparison of the metrics with the threshold values of set S2_m meets the condition(s) of rules/conditions for measurement reporting, the terminal sends a measurement report to the first wireless access network and awaits a steering command.

The terminal of FIG. 11 may operate in a similar manner to FIG. 2 by appropriate selection of the threshold values in the sets of threshold values S1_s, S1_m, S2_s and S2_m. For example, if the set of threshold values S1_m are selected such that they cannot be met in a real network, and the set of threshold values S2_s are selected such that they cannot be met in a real network, the terminal will operate with a direct traffic steering mode until t=Txx expiry, and with a measurement reporting mode after t=Txx expiry.

Figure 12:
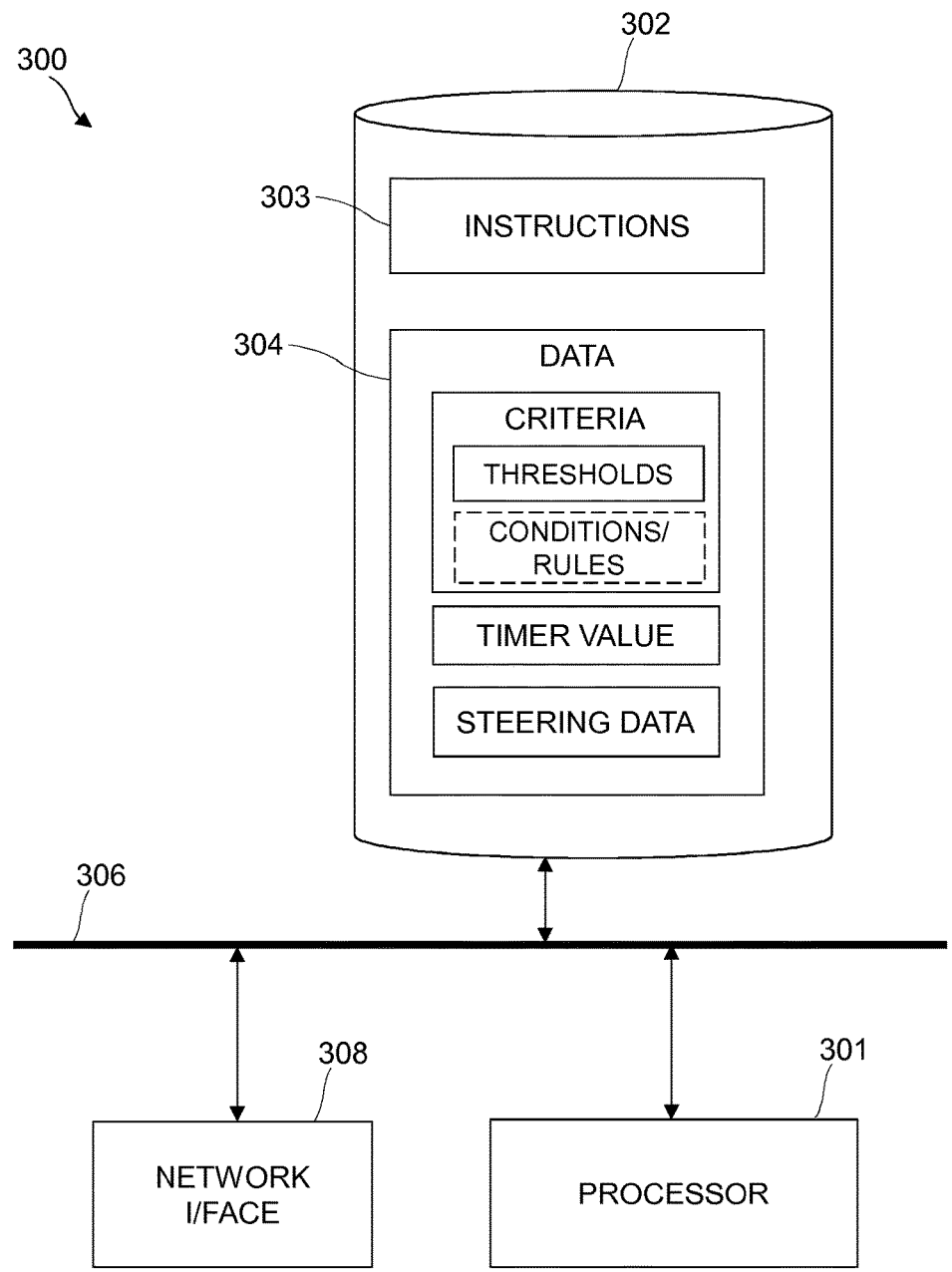
FIG. 12 shows apparatus for use at a network node or base station.

FIG. 12 shows an exemplary processing apparatus 300 which may be implemented as any form of a computing and/or electronic device, and in which embodiments of the system and methods described above may be implemented. Processing apparatus 300 can be provided at one of the nodes of the first wireless access network, such as a nodeB, eNodeB or a higher-level node such as a controller. Processing apparatus may implement the method shown in any of FIGS. 2 to 11. Processing apparatus 300 comprises one or more processors 301 which may be microprocessors, controllers or any other suitable type of processors for executing instructions to control the operation of the device. The processor 301 is connected to other components via one or more buses 306. Processor-executable instructions 303 may be provided using any computer-readable media, such as memory 302. The processor-executable instructions 303 can comprise instructions for implementing the functionality of the described methods. The memory 302 is of any suitable type such as read-only memory (ROM), random access memory (RAM), a storage device of any type such as a magnetic or optical storage device. Data may be stored in memory 302, or in additional memory. The processing apparatus 300 comprises one or more network interfaces 308 for interfacing with other network entities, such as other nodes 10 of the first wireless access network, and the terminal 10. The data 304 can comprise: criteria (e.g. thresholds) for sending to the terminal 10; one or more timer values for timer Txx for sending to the terminal 10; steering data for use in determining whether to steer traffic to the first wireless access network or to the second wireless access network upon receipt of a measurement report from the terminal.

Figure 13:
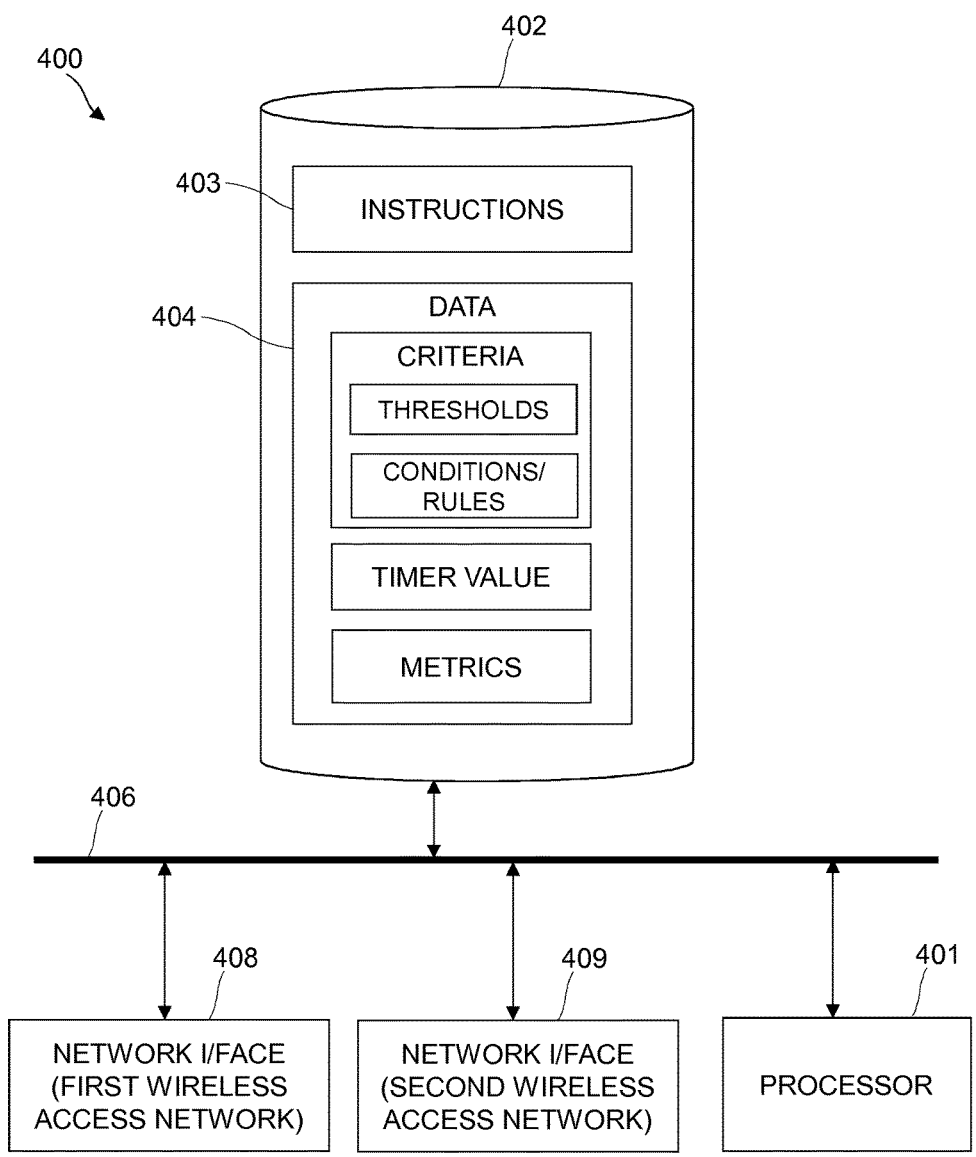
FIG. 13 shows apparatus for use at a terminal.

FIG. 13 shows an exemplary processing apparatus 400 which may be implemented as any form of a computing and/or electronic device, and in which embodiments of the system and methods described above may be implemented. Processing apparatus 400 can be provided at a terminal 10. Processing apparatus may implement the method shown in any of FIGS. 2 to 11. Processing apparatus 400 comprises one or more processors 401 which may be microprocessors, controllers or any other suitable type of processors for executing instructions to control the operation of the device. The processor 401 is connected to other components via one or more buses 406. Processor-executable instructions 403 may be provided using any computer-readable media, such as memory 402. The processor-executable instructions 403 can comprise instructions for implementing the functionality of the described methods. The memory 402 is of any suitable type such as read-only memory (ROM), random access memory (RAM), a storage device of any type such as a magnetic or optical storage device. Data may be stored in memory 402, or in additional memory. The processing apparatus 400 comprises a network interface 408 for interfacing with the first wireless access network. The processing apparatus 400 comprises a network interface 409 for interfacing with the second wireless access network (e.g. a WLAN interface). The network interfaces 408, 409 may be separate, or may co-exist at the RF and/or processing level. The data 404 can comprise: criteria (e.g. thresholds) received from the first wireless access network; one or more timer values for timer Txx received from the first wireless access network; metrics of the first wireless access network and the second wireless access network. The data 404 can comprise conditions/rules for determining whether to perform steering in the traffic steering mode and whether to send a measurement report in the measurement reporting mode.

Figure 14:
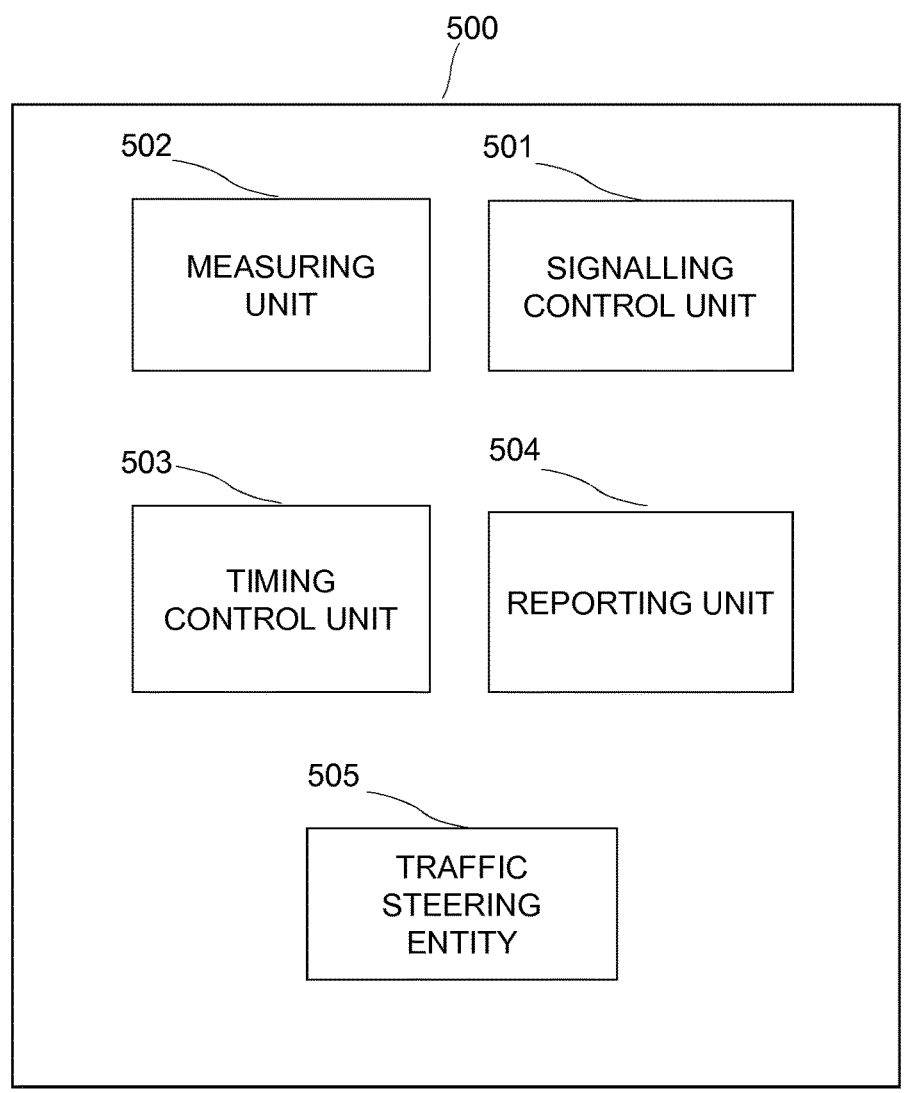
FIG. 14 shows a terminal with logical functions pertinent to the embodiments described herein.

FIG. 14 shows a terminal 500 (e.g. UE) in which any of the aforementioned embodiments may be implemented. The terminal comprises a processing arrangement, or processor, and memory which may be considered as implementing the following logical units and entities. FIG. 14 is not intended to indicate that the units or entities are physically separate. Such units or entities may be implemented by the same processing arrangement or processor. The terminal 500 comprises a Signaling Control Unit 501 for processing signals to and from the RAN. The terminal 500 further comprises a Measuring Unit 502 which is able to determine metrics based on given criteria and physical observations. The terminal 500 further comprises a Timing Control Unit 503 which is able to receive a timer value and after the requested time period indicates that the timer has expired. The terminal 500 further comprises a Reporting Unit 504 which is able to provide reports based on the metrics provided by the Measuring Unit 502. The terminal 500 further comprises a Traffic Steering Entity 505 which is able to route user data between one or more radio accesses.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method at a terminal, the terminal being capable of communicating with a first wireless access network and with a second wireless access network, the method comprising:
receiving criteria from the first wireless access network, the criteria comprising dedicated criteria, wherein the dedicated criteria comprising reporting criteria and steering criteria;
determining when a trigger event occurs and starting a timer;
operating in a first mode for a first time period until expiry of the timer;
operating in a second mode after expiry of the timer, operation in the second mode being different from operation in the first mode;
determining expiry of a second time period, upon expiry of the second time period, using broadcast criteria received in a broadcast transmission from the first wireless access network in place of the dedicated criteria; and
one of the first mode and the second mode comprising a traffic steering mode in which the terminal directly steers at least some traffic when the steering criteria are met and the other one of the first mode and the second mode comprising a measurement reporting mode in which the terminal sends a measurement report when the reporting criteria are met and waits for a traffic steering instruction to steer at least some traffic to one of the first wireless access network and to the second wireless access network.

2. The method according to claim 1, wherein the trigger event is one of:
the terminal leaving a connected mode with respect to the first wireless access network; and
the terminal receiving the criteria from the first wireless access network.

3. The method according to claim 1, wherein the reporting criteria and the steering criteria are the same.

4. The method according claim 1, wherein the reporting criteria and the steering criteria are different.

5. The method according to claim 1, wherein the reporting criteria and the steering criteria comprise a set of threshold values.

6. The method according to claim 1, wherein one of the first mode and the second mode comprises a combination of the traffic steering mode and the measurement reporting mode and the other of the first mode and the second mode consists of only one of the traffic steering mode or the measurement reporting mode.

7. The method according claim 1, further comprising receiving a timer value and using the timer value to determine the first time period.

8. The method according to claim 1, wherein the second time period is less than the first time period.

9. The method according to claim 1, wherein the second time period is longer than the first time period.

10. The method according to claim 1, wherein the criteria received from the first wireless access network are the dedicated criteria received from a first cell of the first wireless access network, the method further comprising:
    determining when the terminal is served by a new cell of the first wireless access network; and
    using the broadcast criteria received in the broadcast transmission from the new cell of first wireless access network in place of the dedicated criteria.

11. The method according to claim 10, further comprising, when it is determined that the terminal is served by a new cell of the first wireless access network, forcing operation in the second mode irrespective of whether the timer has expired.

12. The method according to claim 10, further comprising, when it is determined that the terminal is served by a new cell of the first wireless access network, forcing expiry of the timer and beginning operation in the second mode.

13. The method according to claim 1, further comprising:
    determining if an amount of traffic meets or exceeds a traffic threshold; and
    one of directly steering traffic in the traffic steering mode and sending a measurement report in the measurement reporting mode only if the amount of traffic meets or exceeds the traffic threshold.

14. The method according to claim 1, wherein the traffic steering mode comprises:
    determining metrics with respect to the first wireless access network and a second wireless access network;
    comparing the metrics with steering criteria; and
    steering at least some traffic to one of the first wireless access network and the second wireless access network when the steering criteria are met.

15. The method according to claim 1, wherein the measurement reporting mode comprises:
    determining metrics with respect to the first wireless access network and a second wireless access network;
    comparing the metrics with reporting criteria; and
    sending a measurement report when the reporting criteria are met.

16. A terminal which is capable of communicating with a first wireless access network and with a second wireless access network, the terminal comprising one or more processors configured to:
    receive criteria from the first wireless access network, the criteria comprising dedicated criteria, wherein the dedicated criteria comprising reporting criteria and steering criteria;
    determine when a trigger event occurs and start a timer;
    operate in a first mode for a first time period until expiry of the timer;
    operate in a second mode after expiry of the timer, operation in the second mode being different from operation in the first mode;
    determine expiry of a second time period, upon expiry of the second time period, using broadcast criteria received in a broadcast transmission from the first wireless access network in place of the dedicated criteria; and
    one of the first mode and the second mode comprising a traffic steering mode in which the terminal is configured to directly steer at least some traffic when the steering criteria are met and the other one of the first mode and the second mode comprising a measurement reporting mode in which the terminal is configured to send a measurement report when the reporting criteria are met and waits for a traffic steering instruction to steer at least some traffic to one of the first wireless access network and to the second wireless access network.

17. A method at a node of a first wireless access network, the method comprising:
    sending criteria to a terminal served by the first wireless access network, the criteria comprising dedicated criteria, wherein the dedicated criteria comprising reporting criteria and steering criteria;
    sending the terminal a first timer value which defines a first time period, the terminal being configured to operate in a first mode for a period equal to the first timer value, and the terminal being configured to operate in a second mode after a period equal to the first timer value, operation in the second mode being different from operation in the first mode;
    sending the terminal a second timer value which defines a second time period, the terminal configured to operate using broadcast criteria received in a broadcast transmission from the first wireless access network after a period equal to the second timer value; and
    one of the first mode and the second mode comprising a traffic steering mode in which the terminal directly steers at least some traffic when the steering criteria are met and the other one of the first mode and the second mode comprising a measurement reporting mode in which the terminal sends a measurement report when the reporting criteria are met and waits for a traffic steering instruction to steer at least some traffic to one of the first wireless access network and to a second wireless access network.

18. The method according to claim 17, further comprising sending a message to the terminal to cause the terminal to leave a connected mode with respect to the first wireless access network, wherein the start of the time period is triggered by the terminal leaving the connected mode.

19. The method according to claim 17, wherein the reporting criteria and the steering criteria are the same.

20. The method according to claim 17, wherein the reporting criteria and the steering criteria are different.

21. The method according to claim 17, wherein the reporting criteria and the steering criteria comprise a set of threshold values.

22. An apparatus for use at a node of a first wireless access network, the apparatus comprising one or more processors configured to:
- send criteria to a terminal served by the first wireless access network, the criteria comprising dedicated criteria, wherein the dedicated criteria comprising reporting criteria and steering criteria;
- send the terminal a first timer value which defines a first time period, wherein the terminal being configured to operate in a first mode for a period equal to the first timer value, and the terminal being configured to operate in a second mode after a period equal to the first timer value, wherein operation in the second mode is different to operation in the first mode;
- send the terminal a second timer value which defines a second time period, the terminal configured to operate using broadcast criteria received in a broadcast transmission from the first wireless access network after a period equal to the second timer value; and
- one of the first mode and the second mode comprising a traffic steering mode in which the terminal is configured to directly steer at least some traffic when the steering criteria are met and the other one of the first mode and the second mode comprising a measurement reporting mode in which the terminal is configured to send a measurement report when the reporting criteria are met and wait for a traffic steering instruction to steer at least some traffic to one of the first wireless access network and to a second wireless access network.

* * * * *